United States Patent [19]
Tomchak

[11] Patent Number: 6,053,685
[45] Date of Patent: Apr. 25, 2000

[54] BALE ACCUMULATOR

[76] Inventor: Frank Tomchak, 8917 - 87 St, Edmonton, Alberta, Canada, T6C 3H4

[21] Appl. No.: 09/253,095

[22] Filed: Feb. 22, 1999

[51] Int. Cl.[7] .................................................. A01D 85/00
[52] U.S. Cl. ......................................... 414/24.5; 414/480
[58] Field of Search ................................ 414/24.5, 24.6, 414/111, 469, 480

[56] References Cited

U.S. PATENT DOCUMENTS

| | | | |
|---|---|---|---|
| 4,426,183 | 1/1984 | Butler | 414/24.5 |
| 5,257,885 | 11/1993 | Reil | 414/24.5 |
| 5,496,144 | 3/1996 | Wetz | 414/24.5 |
| 5,511,921 | 4/1996 | Meijer | 414/24.5 |
| 5,664,923 | 9/1997 | Olin | 414/24.5 |

FOREIGN PATENT DOCUMENTS

| | | | |
|---|---|---|---|
| 424192 | 4/1991 | European Pat. Off. | 414/24.5 |
| 2671688 | 7/1992 | France | 414/24.5 |
| 2204826 | 11/1988 | United Kingdom | 414/24.5 |

*Primary Examiner*—Gregory A. Morse

[57] ABSTRACT

The present invention provides a bale accumulator for accumulating at least one cylindrically configured bale of crop stock thereon following its discharge by a baler. The bale accumulator has a cradle assembly for receiving a bale from the baler and transporting it to a receiving platform where it is held pending selective discharge by the operator.

20 Claims, 4 Drawing Sheets

BALE ACCUMULATOR

CROSS-REFERENCE TO RELATED APPLICATIONS

Not applicable

BACKGROUND—FIELD OF INVENTION

The present invention relates generally to apparatus for accumulating cylindrically configured bales of cross stock as the bales are discharged from the baler and discharged onto a designated area therefrom.

BACKGROUND—DESCRIPTION OF PRIOR ART

Bale accumulators of various types are well known within the bailing art. Such accumulators are used in conjunction with square bales of crop stock, loose stacks of crop stock, and cylindrical bales of crop stock of varying diameters. Bale accumulators are generally designed and constructed to receive a plurality of bales of crop stock, typically hay or straw bales, from a baler and to temporarily store the received bales, all without the performance of manual labor by an individual, until they can be delivered to a permanent storage location. While long known in the art, bale accumulators have taken on an increasing level of importance in the farming community as the number of available persons for performing physical labor has decreased in that same community. At least partially as a result of this decrease in available labor, farmers have tended to want to increase the size of the bales of crop stock so as to reduce the overall number of bales that must be handled and have tended to rely on mechanical means for manipulating the bales as desired.

Examples of bale accumulators are found, for example, in U.S. Pat. No. 3,157,295 to Pridgeon, et al; U.S. Pat. No. 4,050,598 to Schultz; U.S. Pat. No. 4,103,794 to Shaw; U.S. Pat. No. 4,190,391 to Semer, et al; U.S. Pat. No. 4,268,199 to Pontrier; U.S. Pat. No. 4,376,607 to Gibson; U.S. Pat. No. 4,573,845 to Carpenter; U.S. Pat. No. 4,619,570 to Siebonga; U.S. Pat. No. 4,938,646 to Elias, and to U.S. Pat. No. 5,664,923 to Olin, et al. The accumulators disclosed in the foregoing patents often rely on complex mechanical apparatus to function and are not readily able to handle the large cylindrical bales currently finding widespread favor in the farming community. These bales may fall within a weight range of about 500 pounds to about 2500 pounds and have diameters between 3 feet and 6 feet.

In a typical baling operation, a large cylindrical bale is baled by a baler pulled by a motive source of power, such as a farm tractor, that is operated by the farmer. The baler usually takes the form of including a front portion and a rear discharge gate pivotally mounted thereto that together with the front portion forms there within a bale forming chamber. When a bale is formed, the rear discharge gate will be pivoted open and the bale will be discharged onto the ground. The end result is a large number of these large bales being scattered across a field that needs to be gathered and stored in a single location.

It would be desirable to have a bale accumulator for bales of the size falling within the aforementioned range that provided the farmer with the option of conveying a plurality of bales to a single desired storage location or of depositing a plurality of bales at a plurality of locations in the field so as to cease the later accumulation and storage of the bales at the desired storage location.

SUMMARY OF THE INVENTION

It is an object of the present invention to provide new and improved apparatus that is not subject to the foregoing disadvantages of the prior art bale accumulators.

It is another object of the present invention to provide an improved bale accumulator for large cylindrically configured bales of crop stock.

It is still another object of the present invention to provide an improved bale accumulator that is readily disassembled into a plurality of modules for easy transport thereof.

It is yet another object of the present invention to provide an improved bale accumulator that includes a hydraulic operated bale cradle that conveys bales of crop stock to a temporary receiving platform.

It is still another object of the present invention to provide an improved bale accumulator for large cylindrical bales of crop stock for operation on hilly terrain.

Another important object of the present invention is to provide an improved bale accumulator for large cylindrical bales of crop stock to have a short turning radius.

In an embodiment of the present invention the first portion of the accumulator includes means for attaching a pair of elongated members in a vee configuration, laying in a horizontal position forming a hitch frame, coupled to a crop baler. The hitch frame supports the cradle assembly in the receiving mode position for crop stock.

The receiving and transporting of a crop bale to the receiving platform may be a segmental cradle base carrier actuated by dual hydraulic cylinders. From a nearly vertical upright position the cradle moves forward and downwardly onto the vee member hitch frame. The hydraulic cylinders continues to move cradle assembly in a horizontal linear direction to position the cradle under rear discharge gate of crop baler to receive crop stock.

The operation of the dual hydraulic cylinders are reversed causing crop baler and cradle to slide rearward and then in a nearby vertical upright position and horizontally rearward, the rotational effect of the cradle hinged segments forcing crop bale onto the receiving platform of the second accumulator portion.

The second accumulator portion may include a main chassis with ground engaging wheels. The main chassis may support a receiving platform pivoting on the rear end of the main chassis. The receiving platform may have a pivotal discharge gate on the rear end, to discharge crop bales.

The second accumulator portion may further include means for selectively allowing discharge of accumulator crop bales from receiving platform by means of dual hydraulic cylinders raising front end of receiving platform causing discharge gate to move from a near vertical position for retention of any crop bale on receiving platform to an open horizontal position for discharge of crop bales from receiving platform.

Other objects of the present invention to provide a bale accumulator to include means to adapt to different sizes of manufactured balers. A bale accumulator according to the present invention has means to position the hydraulic assemblies support frame with the cradle assembly attached behind a baler to receive a discharged crop bale which can vary in size between manufactured balers. An improved embodiment of the present invention is a cradle assembly which is segmental to operate in the narrow confines between and under the attached bale discharge gate.

It is still yet another object of the present invention to provide an improved bale accumulator that is readily disassembled into a plurality of assemblies for easy transport thereof.

The present invention further contemplates a method for accumulating on a bale accumulator a plurality of sequentially formed substantially cylindrical configured bales of crop stock produced by a baler including the steps of moving crop bales in a nearly horizontal and then upright manner from the first accumulator portion to the second accumulator portion receiving platform a plurality of crop bales.

The hydraulic raising of receiving platform causing discharge gate to open releasing crop bales onto the ground, and lowering of receiving platform closes discharge gate.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
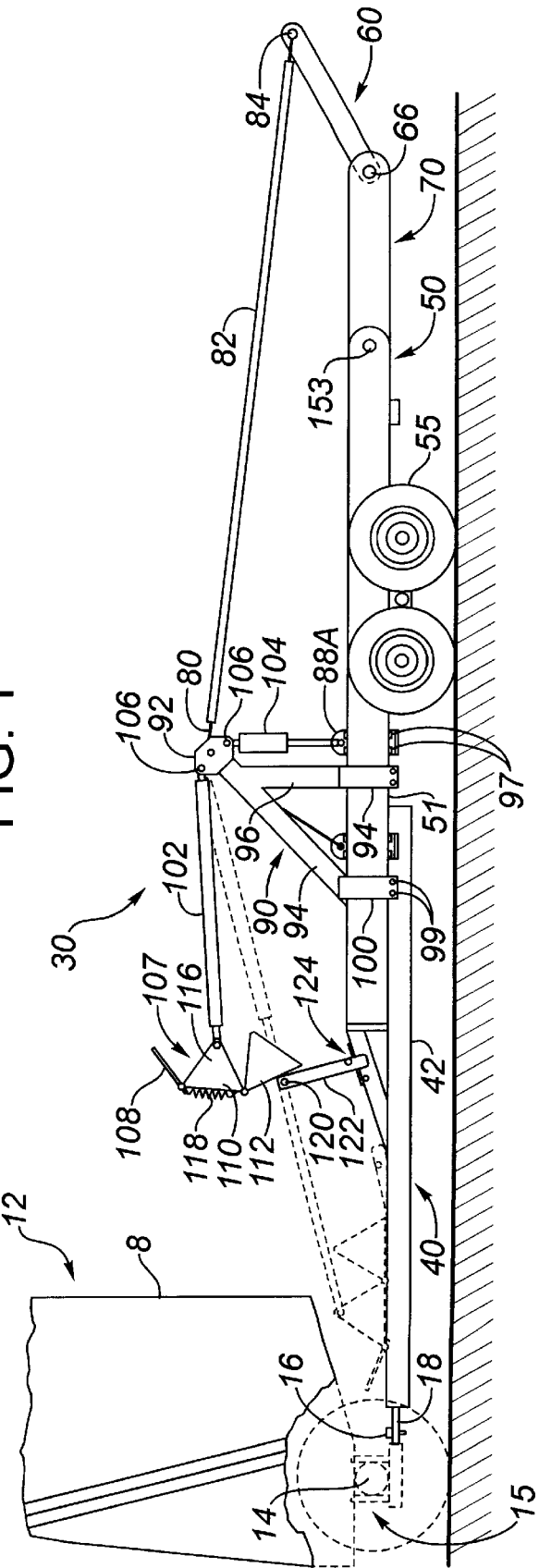
FIG. 1 is a side elevation view of a bale accumulator in accord with the present invention.

FIG. 1 shows a bale accumulator 30 in accordance with the present invention for receiving large cylindrical bales 10 from a baler 12, and storing them until bales can be transported to a desired storage location.

Bale accumulator 30 is attached to the axle 14 of baler 12 by means of conventional apparatus such as bolt on hitch adapter 15 as shown with a threaded bolt and nut fastened to tongue 18 of bale accumulator 30.

Figure 2:
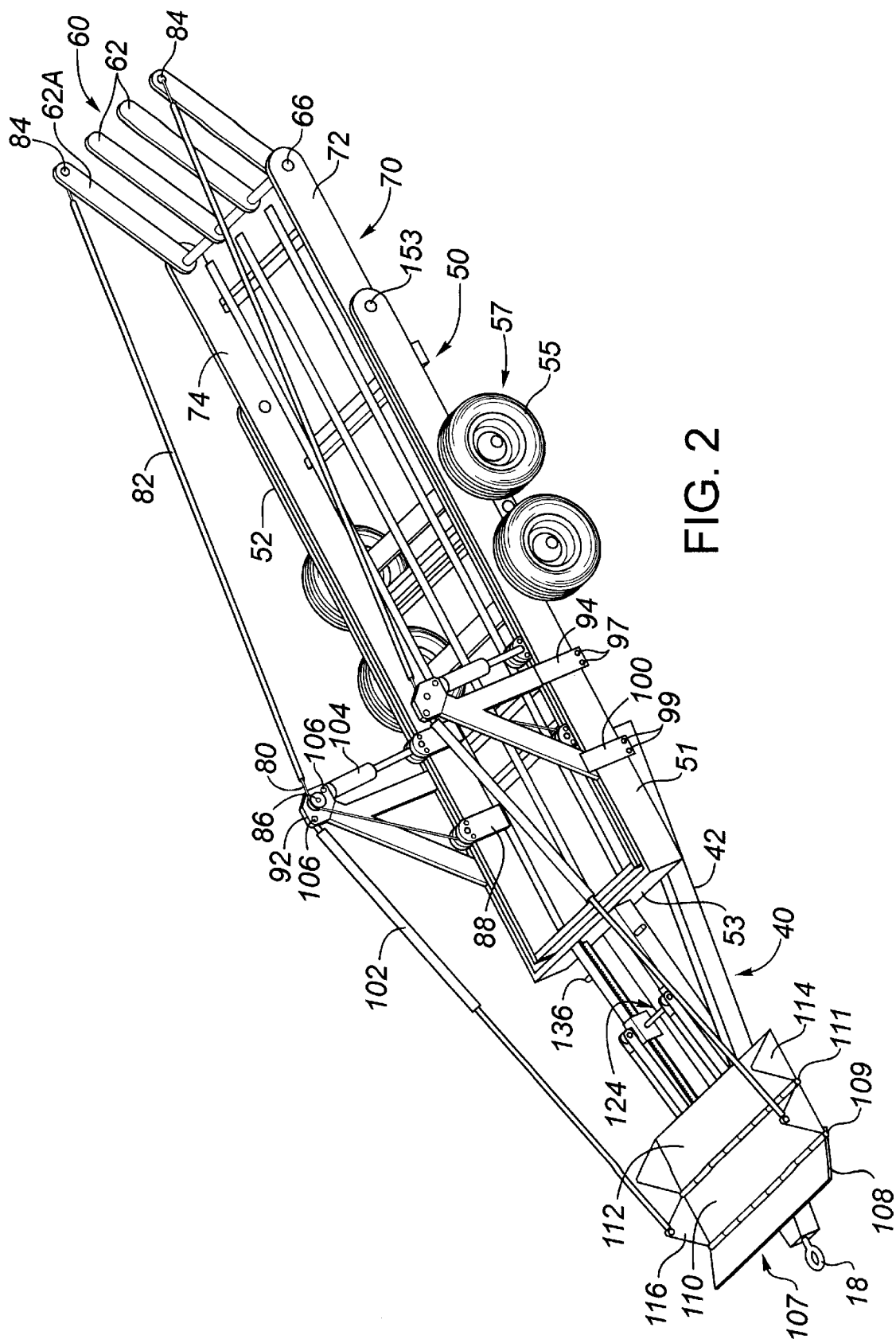
FIG. 2 is a perspective view of a bale accumulator in accord with the present invention.
Figure 3:
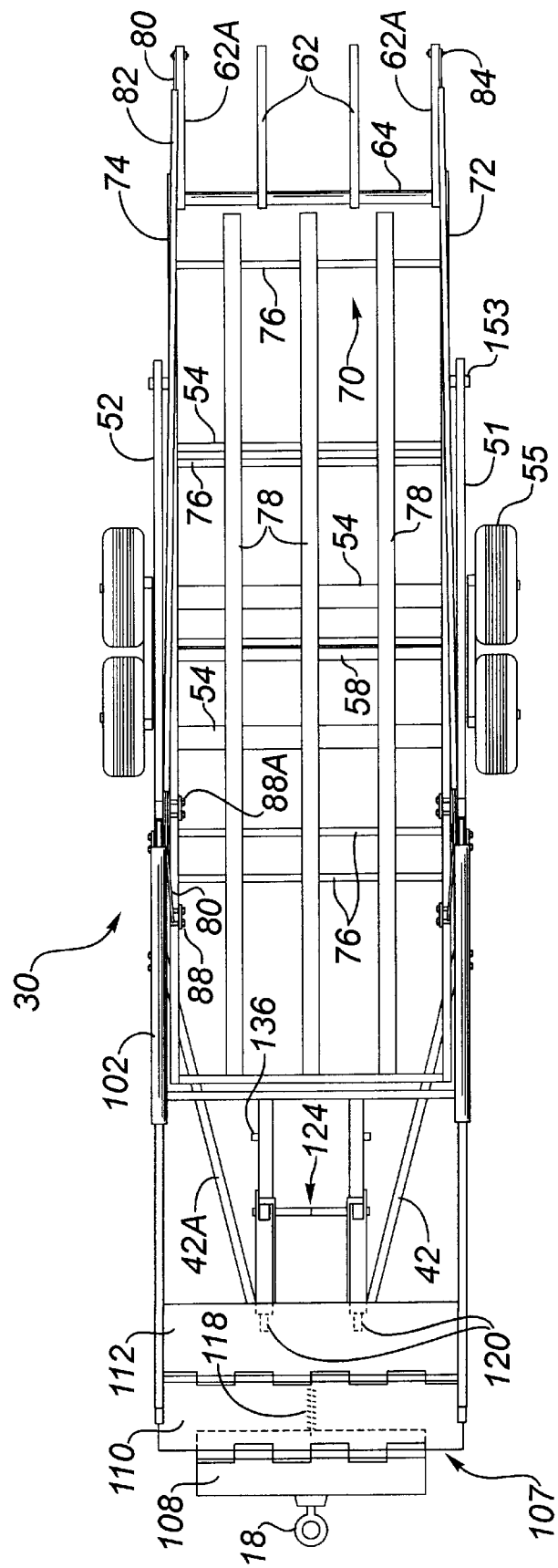
FIG. 3 is a top elevation view of a bale accumulator in accord with the present invention.

Referring now to FIG. 2 and FIG. 3 bale accumulator 30 includes supporting hitch frame 40 attached to main chassis frame 50. Hitch frame 40 comprises a pair of front to rear extending member 42 and 42A in a longitudinal narrow vee configuration with hitch tongue 18 attached to base of vee configuration, the ends of member 42 and member 42A are held in place attached to main frame 50, transverse member 53, member 51, member 52, frame 50 comprises of a pair of elongated members 51 and 52, held in place by multiple parallel transverse members 54 spaced apart, fastened to the underside of members 51 and 52. To complete the rigidity, front of main chassis frame 50 is supported by member 53 in an upright position.

Referring to FIG. 1 it can be seen when bale accumulator is attached to baler 12 hitch frame 40, main chassis frame 50 are substantially parallel with a planar ground surface.

As shown in FIG. 1 and FIG. 2, the aforementioned bale carrier, main chassis frame 50 is supported upon ground engaging wheels 55 forming part of walking beam assembly collectively designated 57 with each pair of side wheels being connected to a walking beam pivoting on an axle 58 fastened to main chassis frame 50.

Referring now primarily to FIG. 2 and FIG. 3, bale receiving platform 70 will be described as having a frame comprising a pair of elongated parallel spaced apart horizontally extending frame members 72 and 74 are held apart in their spaced relationship by a multiply transverse frame member 76, receiving platform positioned within main chassis frame, pivoting on end of main chassis frame on pivot 53.

Referring again to FIG. 2 and FIG. 3, receiving platform 70 includes elongated spaced apart members 78 a top transverse 76 member to form a rigid receiving platform shallower than frame members 72 and 74. Receiving platform 70 rear end may also include a discharge gate 60 comprising a plurality of bars 62 and 62A, and are attached at an end to a tube 64 which rotates on pivot 66.

As shown in FIG. 1 and FIG. 2, discharge gate 60 includes a release cable 80 passing through rigid tubing 82 and fastened to outer discharge gate bars 62A at the top end with a threaded nut and bolt 84 passing through eye on one end of cable 80. The other end of cable 80 passes over an into pulley 86 vee groove downward to and attached to strap clevis 88 mounted around member 72 and 74 with threaded nut and bolt passing through eye of cable 80 secured to clevis 88.

Again referring to FIG. 1 and FIG. 2, it is shown a pair of upright configurate support frame 90 for hydraulic assemblies, 102 and 104. Support frame 90 comprises of a pair of vertical head plates 92 attached to top end of member 94 angled more or less 45° with attached base clevis 100 positioned around member 51 and 52, and tightened together by known fastening means such as a nut on bolt fastener 99. Joining near top of member 94 a vertical support 96 has a base strap clevis 94 positioned around member 51 and 52 and fastened with nut and bolts 97, to show a configurated upright support frame for hydraulic assemblies 102 and 104 and cable release pulley 86. Hydraulic assemblies 102 and 104 end are sandwiched between head plates 92 and fastened with threaded bolt and nut 106. Other end of hydraulic assembly 104 attached to strap clevis 88A.

Referring again to FIG. 1 and FIG. 2, to show cradle assembly 107 comprising a plurality of longitudinal member segments, 108 attached to member 110 with hinge 109, member 110 attached to member 112 with hinge 111, a triangle configurated side wall 114 perpendicular attached to ends of member 112. Hydraulic assembly 102 end is pivotally attached to triangle configurated side wall 116.

The perpendicular side wall 116 attached to end of segment 110 shown in FIG. 1, retracting spring 118 end is attached to underside of segment 110, other end of spring 118 attached to edge of segment 108.

Figure 4:
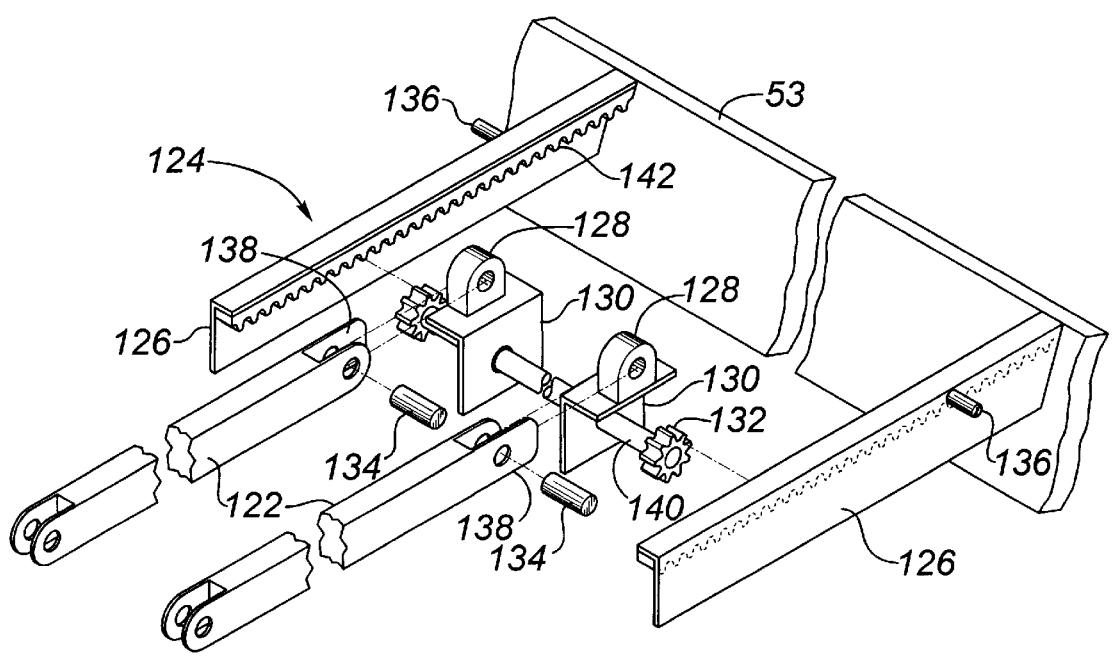
FIG. 4 is a perspective explode view in accord with the present invention.

Segment 108 is bent along its horizontal axis 45° more or less forming a cradle in conjunction with segments 110 and 112. As shown in FIG. 4, underside of segment 112 has pair of lugs 120 to which cradle assembly members 122 are pivotally attached.

Referring now primarily to FIG. 4, stabilizer assembly 124 will be shown as a perspective exploded view comprising of cradle assembly members 122, leg ends 138, pivotally attached to lug 128 by means of pin 134. Tooth bar 142 attached to underside of angular member 126 forming a bar track, gear 132 is fixed on ends of axle 140. The underside of angular member 130 is positioned on top of angular member 126, gear 132 engaged with tooth bar 142. When cradle assembly member 122, leg end 138 is in upright position along stop member 136, will form a latched position to prevent stabilizer assembly from kicking out.

OPERATION OF THE PRESENT INVENTION

Referring now to FIG. 1 a bale discharging sequence will be described. As shown in FIG. 1 baler 12 includes a rear gate 8 that is pivotally attached to a baler front portion and together therewith forms a bale forming chamber. When a formed bale is nearly ready for discharge, the operator will actuate a hydraulic lever control to move the cradle assembly 107 from a near upright position downward onto the hitch frame 40. As the hydraulic assembly 102 is extending the cradle assembly segments 112, 110 and 108 will lay horizontally on the hitch frame 40. The operator will sense the timing required and stop the baler 12 movement forward to discharge the bale. When the hydraulic assembly 102 is fully extended the fluid pressure will build up overriding a pressure valve control (not shown) allowing fluid to baler hydraulics to open baler discharge gate 8 and discharging crop stock bale onto cradle assembly 107.

A baler indicator will show the operator the discharge gate is open, crop bale is released onto the cradle.

The operator will now reverse the hydraulic lever position allowing fluid to flow to hydraulic assembly 102 to contract. During contraction the cradle assembly 107 will slide on the hitch assembly 40 until the stabilizer assembly 124 stops against frame member 63. 112 will curve around crop bale and transport the crop bale onto receiving platform 70. When the cradle assembly 107 is in the upright position hydraulic assembly 102 contracted, fluid pressure overrides a pressure valve (not shown) returning fluid to baler 12 hydraulics and close discharge gate 8 of baler 12.

The sequence is repeated and the following crop bale discharged onto cradle assembly 107, hydraulic assembly 102 retracting cradle assembly 107 with bale of crop stock which will push the first bale or a plurality of bales along the receiving platform 70.

To discharge the accumulator crop stock bales at a designated area, a separate pair of hydraulic assemblies 104 is actuated by the operator causing hydraulic assembly 104 to retract, causing front of receiving platform 70 to raise, pivoting on rear end. The raising of receiving platform 70 creates slack on cable 80 thus lowering discharge gate 60, and crop stock bales roll off receiving platform. The operator then reverses hydraulic fluid and lowers receiving platform, cable 80 will tighten and return discharge gate 60 to original rear upright position.

The present invention having thus been described, other modifications, alterations or substitutions may now suggest themselves to those skilled in the arts, all of which are in the spirit and scope of the present invention. It is therefore that the present invention be limited only by the scope of the attached claims.

What is claimed is:

1. A bale accumulator capable of being towed behind a baler for producing round bales of crop stock, said bale accumulator comprising:

first and second accumulator portions;

the first accumulator portion comprising a cradle means for directly receiving a round bale from the baler and transporting the bale to the second accumulator portion and a v-shaped frame with a hitch for coupling to a baler;

the second accumulator portion comprising means for receiving the bale from the first portion and retaining the bale until the bale is discharged from the second accumulator portion, wherein the means for receiving and retaining includes a receiving platform;

an accumulator gate for selectively discharging the bales held by the second accumulator portion, the gate including a bottom end pivotally attached to the receiving platform and a top end; and actuator means for selectively moving the discharge gate between an open position and a closed position, the actuator means comprising a cable with one end attached to the top end of the discharge gate, the body of the cable running through a conduit and passing around a pulley, and an other end of the cable attached to the receiving platform.

2. A bale accumulator capable of being towed behind a baler for transporting round bales of crop stock produced by the baler, the bale accumulator comprising:

(a) a first accumulator portion for coupling with the baler, the first accumulator portion comprising a pivotal cradle for receiving bales from the baler and delivering the bales to the second accumulator portion; and (b) a second accumulator portion connected with the first accumulator portion and comprised a main frame and a receiving platform pivotally mounted with the main frame, wherein the receiving platform has a front end for receiving a round bale onto the receiving platform and a rear end for discharging the round bale from the receiving platform and wherein the receiving platform is pivotable between a substantially horizontal position for transporting the round bales and an inclined position for discharging the round bales from the rear end of the receiving platform;

(c) a discharge gate associated with the rear end of the receiving platform and movable between a closed position to inhibit the discharge of the round bales and an open position to permit the discharge of the round bales upon the pivoting of the receiving platform, wherein the discharge gate is moved towards the closed position upon pivoting of the receiving platform towards the horizontal position and wherein the discharge gate is moved towards the open position upon the pivoting of the receiving platform towards the inclined position.

3. The bale accumulator as claimed in claim 2 wherein the discharge gate has a top end and a bottom end pivotally attached with the rear end of the receiving platform such that the top end pivots about the bottom end towards the open position of the discharge gate upon the pivoting of the receiving platform towards the inclined position.

4. The bale accumulator as claimed in claim 3 further comprising an actuator associated with the discharge gate for actuating the discharge gate between the open and closed positions upon the pivoting of the receiving platform.

5. The bale accumulator as claimed in claim 4 wherein the actuator is comprised of a cable having a first end attached with the discharge gate and a second end attached with the receiving platform such that pivoting of the receiving platform towards the inclined position moves the cable to permit the discharge gate to move towards the open position.

6. The bale accumulator as claimed in claim 5 wherein the second accumulator portion is further comprised of a support frame extending from the main frame and wherein the actuator is further comprised of a pulley mounted with the support frame for engaging the cable such that the cable extends about the pulley between the first and second ends to form an angle therein.

7. The bale accumulator as claimed in claim 6 wherein the second accumulator portion is further comprised of a piston extending between the support frame and the receiving platform such that actuation of the piston pivots the receiving platform relative to the main frame between the horizontal and inclined positions.

8. The bale accumulator as claimed in claim 6 wherein the cradle is comprised of a cradle assembly actuatable between an extended position for receiving the round bale from the baler and a contracted position for discharging the round bale from the cradle assembly to the receiving platform.

9. The bale accumulator as claimed in claim 8 wherein the cradle assembly is comprised of at least two segments pivotally connected together and wherein the segments are substantially planar in the extended position of the cradle assembly and wherein the actuation of the cradle assembly towards the contracted position pivots the segments relative to each other to form a cradle for supporting the round bale therein.

10. The bale accumulator as claimed in claim 9 wherein actuation of the cradle assembly from the extended position towards the contracted position moves the cradle assembly substantially horizontally from the extended position to a pivot point and rotates the cradle assembly about the pivot point towards the contracted position.

11. The bale accumulator as claimed in claim 10 wherein the first accumulator portion is further comprised of:
   (a) a cradle assembly member extending from the second accumulator portion for movably supporting the cradle assembly, wherein the cradle assembly is movable substantially horizontally thereon between the extended position and the pivot point; and
   (b) a stop member associated with the cradle assembly member for engaging the cradle assembly at the pivot point, wherein the engagement of the cradle assembly and the stop member rotates the cradle assembly about the stop member towards the contracted position.

12. The bale accumulator as claimed in claim 11 wherein the cradle assembly is comprised of an inner segment and an outer segment pivotally connected together, wherein the first accumulator portion is further comprised of a piston extending between the second accumulator portion and the outer segment of the cradle assembly such that actuation of the piston actuates the cradle assembly between the extended and contracted positions and wherein actuation of the piston towards the contracted position pivots the outer segment relative to the inner segment to form the cradle for supporting the round bale.

13. The bale accumulator as claimed in claim 12 wherein the piston extends between the support frame of the second accumulator portion and the outer segment of the cradle assembly.

14. The bale accumulator as claimed in claim 6 wherein the first accumulator portion is further comprised of a hitch for coupling with the baler and a hitch frame for supporting the hitch, wherein the hitch frame is substantially v-shaped.

15. The bale accumulator as claimed in claim 2, wherein the cradle further comprises means for stabilizing a forward edge of the cradle so that it remains parallel to a pivot axis of the cradle.

16. A bale accumulator capable of being towed behind a baler for transporting round bales of crop stock produced by the baler, the bale accumulator comprising:

(a) a first accumulator portion for coupling with the baler, wherein the first accumulator portion is comprised of a cradle assembly actuatable between an extended position for receiving a round bale from the baler and a contracted position for discharging the round bale from the cradle assembly; and
   (b) a second accumulator portion connected with the first accumulator portion and comprised of a receiving platform for receiving the round bale from the cradle assembly when the cradle assembly is actuated to the contracted position;
   wherein the cradle assembly is comprised of at least two segments pivotally connected together and wherein the segments are substantially planar in the extended position of the cradle assembly and wherein the actuation of the cradle assembly towards the contracted position pivots the segments relative to each other to form a cradle for supporting the round bale therein.

17. The bale accumulator as claimed in claim 16 wherein actuation of the cradle assembly from the extended position towards the contracted position moves the cradle assembly substantially horizontally from the extended position to a pivot point and rotates the cradle assembly about the pivot point towards the contracted position.

18. The bale accumulator as claimed in claim 17 wherein the first accumulator portion is further comprised of:
   (a) a cradle assembly member extending from the second accumulator portion for movably supporting the cradle assembly, wherein the cradle assembly is movable substantially horizontally thereon between the extended position and the pivot point; and
   (b) a stop member associated with the cradle assembly member for engaging the cradle assembly at the pivot point, wherein the engagement of the cradle assembly and the stop member rotates the cradle assembly about the stop member towards the contracted position.

19. The bale accumulator as claimed in claim 18 wherein the cradle assembly is comprised of an inner segment and an outer segment pivotally connected together and wherein the piston extends between the second accumulator portion and the outer segment of the cradle assembly such that actuation of the piston towards the contracted position pivots the outer segment relative to the inner segment to form the cradle for supporting the round bale.

20. The bale accumulator as claimed in claim 19 wherein the first accumulator portion is further comprised of a hitch for coupling with the baler and a hitch frame for supporting the hitch, wherein the hitch frame is substantially v-shaped.

* * * * *